US011032136B2

(12) United States Patent
Karivaradaswamy

(10) Patent No.: US 11,032,136 B2
(45) Date of Patent: Jun. 8, 2021

(54) DISCOVERY OF NETWORK CAMERA DEVICES

(71) Applicant: Microsoft Technology Licensing, LLC, Redmond, WA (US)

(72) Inventor: Sathyanarayanan Karivaradaswamy, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/886,785

(22) Filed: Feb. 1, 2018

(65) Prior Publication Data

US 2019/0238405 A1 Aug. 1, 2019

(51) Int. Cl.
| | |
|---|---|
| *H04L 12/24* | (2006.01) |
| *G06F 8/61* | (2018.01) |
| *G06F 9/4401* | (2018.01) |
| *H04L 29/08* | (2006.01) |
| *H04N 5/232* | (2006.01) |
| *G06F 13/10* | (2006.01) |
| *H04N 21/485* | (2011.01) |
| *H04N 21/845* | (2011.01) |
| *H04N 21/442* | (2011.01) |

(Continued)

(52) U.S. Cl.
CPC ............ *H04L 41/0809* (2013.01); *G06F 8/61* (2013.01); *G06F 9/4413* (2013.01); *G06F 13/10* (2013.01); *H04L 67/16* (2013.01); *H04N 5/23206* (2013.01); *G06F 9/545* (2013.01); *G06F 13/102* (2013.01); *H04N 21/4223* (2013.01); *H04N 21/44227* (2013.01); *H04N 21/485* (2013.01); *H04N 21/845* (2013.01)

(58) Field of Classification Search
CPC ....... H04L 41/0809; H04L 67/16; G06F 8/61; G06F 9/4413; G06F 3/10; H04N 5/23206
See application file for complete search history.

(56) References Cited

U.S. PATENT DOCUMENTS

| | | | |
|---|---|---|---|
| 6,809,830 B1 * | 10/2004 | Lafky | G06F 3/1204 358/1.13 |
| 8,161,198 B2 * | 4/2012 | Kikuchi | G06F 8/62 710/8 |

(Continued)

OTHER PUBLICATIONS

"International Search Report and Written Opinion Issued in PCT Application No. PCT/US19/015043", dated Apr. 29, 2019, 11 Pages.

*Primary Examiner* — Tim T Vo
*Assistant Examiner* — Phong H Dang

(57) ABSTRACT

A system for camera device discovery and enumeration detects a camera device connected to a computing device using a Universal Plug and Play (UPnP) protocol and generates a device object corresponding to the detected camera device with a user-mode camera driver. The user-mode camera driver associated with an operating system executing on the computing device. The system registers the generated device object with the operating system to provide a direct interface from the operating system to the camera device and to make the camera device available to a plurality of applications executing on the computing device and commands the camera device from at least one of the plurality of applications via the registered device object through the operating system, thereby improving the functioning of the computing device and the user experience.

20 Claims, 7 Drawing Sheets

(51) Int. Cl.
   *G06F 9/54* (2006.01)
   *H04N 21/4223* (2011.01)

(56) References Cited

U.S. PATENT DOCUMENTS

| | | | |
|---|---|---|---|
| 8,554,957 B1* | 10/2013 | Wieland | G06F 9/4411 |
| | | | 710/8 |
| 2003/0065857 A1* | 4/2003 | Lin | G06F 13/102 |
| | | | 710/302 |
| 2005/0108369 A1* | 5/2005 | Sather | G06F 9/4411 |
| | | | 709/220 |
| 2005/0246564 A1* | 11/2005 | Bhesania | G06F 9/4411 |
| | | | 713/320 |
| 2006/0253859 A1* | 11/2006 | Dai | G06F 9/4413 |
| | | | 719/321 |
| 2007/0046562 A1* | 3/2007 | Polivy | G06F 9/54 |
| | | | 345/1.2 |
| 2007/0220563 A1 | 9/2007 | Wu | |
| 2008/0144648 A1* | 6/2008 | Rostron | G06F 11/3495 |
| | | | 370/463 |
| 2009/0138625 A1* | 5/2009 | Lee | G06F 9/4812 |
| | | | 710/23 |
| 2011/0179184 A1 | 7/2011 | Breau et al. | |
| 2013/0097244 A1* | 4/2013 | Manley | H04L 51/18 |
| | | | 709/204 |
| 2014/0289622 A1* | 9/2014 | Riggs | G06F 3/048 |
| | | | 715/716 |
| 2017/0064344 A1* | 3/2017 | Petersen | H04N 21/2385 |

* cited by examiner

DISCOVERY OF NETWORK CAMERA DEVICES

CROSS-REFERENCE TO RELATED APPLICATION

This application is related to co-filed U.S. application Ser. No. 15/886,798, entitled "STANDARDIZED DEVICE DRIVER HAVING A COMMON INTERFACE", filed Feb. 1, 2018, which is incorporated by reference herein in its entirety.

BACKGROUND

Various vendors and manufacturers provide different devices that can be connected to a network, such as cameras for connection to a home network. For camera devices, these devices can have different configurations and presently need vendor/manufacturer software, or other specialized software, to support the cameras from each different vendor/manufacturer.

To enumerate cameras connected to a local network and expose those cameras (e.g., Internet Protocol (IP) cameras) to the operating system, a different vendor/manufacturer specific application has to be installed on the operating system. The setup process for each of the different applications adds time and complexity to the installation and control arrangement for the cameras, including during the initial installation as well as when updating the camera applications. As the number of different camera vendors and manufacturer for networked cameras increases, additional applications have to be installed on the operating system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for camera device discovery and enumeration comprises detecting a camera device connected to a computing device using a Universal Plug and Play (UPnP) protocol and generating a device object corresponding to the detected camera device with a user-mode camera driver. The user-mode camera driver is associated with an operating system executing on the computing device. The computerized method further comprises registering the generated device object with the operating system to provide a direct interface from the operating system to the camera device and to make the camera device available to a plurality of applications executing on the computing device. The computerized method additionally comprises providing communication between the camera device and the plurality of applications via the registered device object through the operating system.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

The computing devices and methods described herein are configured to discover and expose cameras (e.g., Universal Serial Bus (USB) Internet Protocol (IP) cameras) on a network to all applications on a computer. Using a user-mode camera driver, camera device discovery and enumeration exposes any cameras connected to the network, which in one example, is all cameras configured using the Universal Plug and Play (UPnP) protocol. One or more of the exposed camera devices are then selected, for example, for video streaming with data packets parsed via a common parser plugin (CPP) in one example. All camera devices connected to the network are exposed to the operating system using generic camera device objects and made available to all applications. This allows for more efficient and simplified discovery and installation of the camera devices, and improves the user experience.

Using UPnP to identify network connected cameras in combination with the user-mode camera driver, which conforms to the User-Mode Driver Framework (UMDF) in various examples, a generic or universal registration module allows the operating system to identify the cameras connected to the network. The operating system then makes the exposed cameras available to various applications without using a separate vendor specific application for each camera type and/or vendor. During control operations when receiving data packets, the CPP configures a payload for processing to formulate a useable data stream that is provided to a display pipeline, thereby simplifying the camera detection and data streaming process. This improves the functioning of the computer.

Although the examples described and illustrated herein are implemented with a camera device having particular features and having a particular configuration, these are only exemplary implementations and not a limitation. As those skilled in the art will appreciate, the present disclosure is suitable for application in a variety of different types of camera devices having any configuration, as well as non-camera devices, such as other peripheral devices capable of being connected to a computing device.

Figure 1:
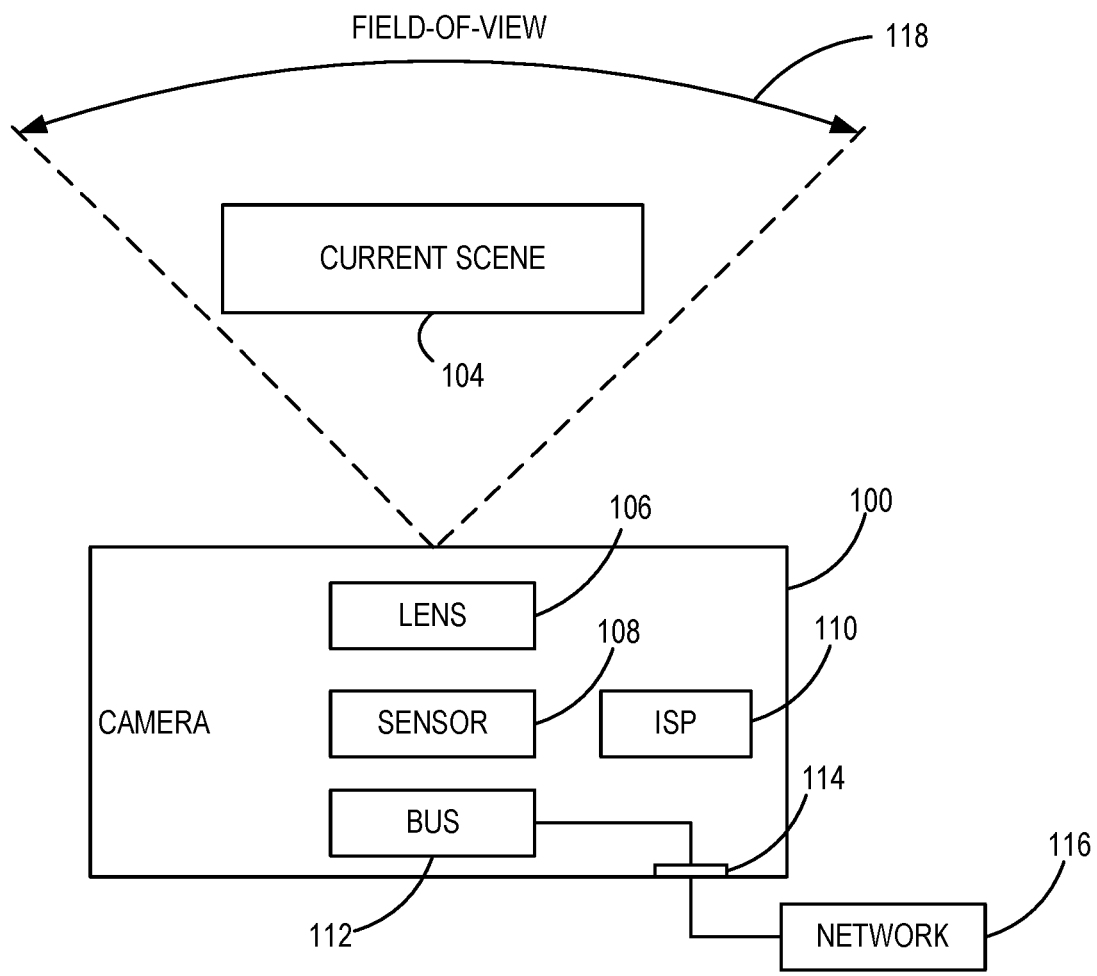
FIG. 1 is an exemplary block diagram illustrating a camera according to an embodiment.

FIG. 1 is an exemplary block diagram illustrating a camera device, specifically, a camera 100 capable of capturing images (e.g., still images or video) and that may be configured to communicate using a user-mode camera driver. The camera 100 (e.g., an IP digital camera) can acquire a plurality of images of a scene 104 (illustrated as a current scene) using a lens 106 and a sensor 108 (e.g., a charge-coupled device (CCD) or a complementary metal-oxide-semiconductor (CMOS) active pixel sensor) of the camera 100. The camera 100 further includes an image signal processor (ISP) 110 configured to process the data from the sensor 108 to generate images, such as streaming video. The ISP 110 in some examples is a specialized digital signal processor (DSP) configured for image processing in the camera 100. The components of the camera 100, including the ISP 110 are configured to be exposed to a network 116 and controlled using the user-mode camera driver, described in more detail herein.

The camera 100 also includes a bus 112 (e.g., USB bus, Peripheral Component Interconnect (PCI) bus, Mobile Industry Processor Interface (MIPI) bus, etc.) that allows communication of data within the camera 100 and external to the camera 100 via a connector 114. For example, the connector 114 allows for connection of the camera 100 to the network 116 to transfer data to the network 116, such as still images or video (e.g., USB camera video images) captured within a field-of-view 118 of the camera 100. The communication via the bus 112 and external to the camera 100 to communicate data to the network 116 (e.g., stream video), in one example, uses the CPP that allows for the dynamic recognition of the data stream, launch a plug-in, parse the incoming data stream and then convert the data packets into a data frame (e.g., video frame) that can be displayed.

It should be appreciated that the camera 100 may be any type of camera device capable of acquiring digital images and can be used in different applications. The camera 100 is a fixed camera in some examples and a movable or moving camera in other examples. For example, the camera 100 in one example is a surveillance camera that is a fixed camera, but new devices, such as a new laptop computer come within proximity of the camera 100 (e.g., within a Wi-Fi range of the camera 100) and the user of the laptop wants to see the data streams being streamed to other devices or over the network 116. As another example, the camera 100 is a movable camera couple to or integrated with a drone. As such, the camera 100 is movable and can be connected with different devices as the drone moves, such as to connecting to nearby laptops (e.g., drone delivering a box to a house). The present disclosure simplifies exposing the camera 100 to the network 116 and/or nearby computing devices (e.g., laptop computers, tablet devices, mart phones, etc.), such that all applications in the computing devices are exposed to the camera 100 on the network 116. As should be appreciated, various examples allow for exposing multiple cameras 100.

It should also be appreciated that the camera 100 in various examples is configured having different functionalities. In one example, the camera 100 is configured to perform computer vision, including, presence detection, motion detection, object categorization, imminent collision detection, etc.

Figure 2:
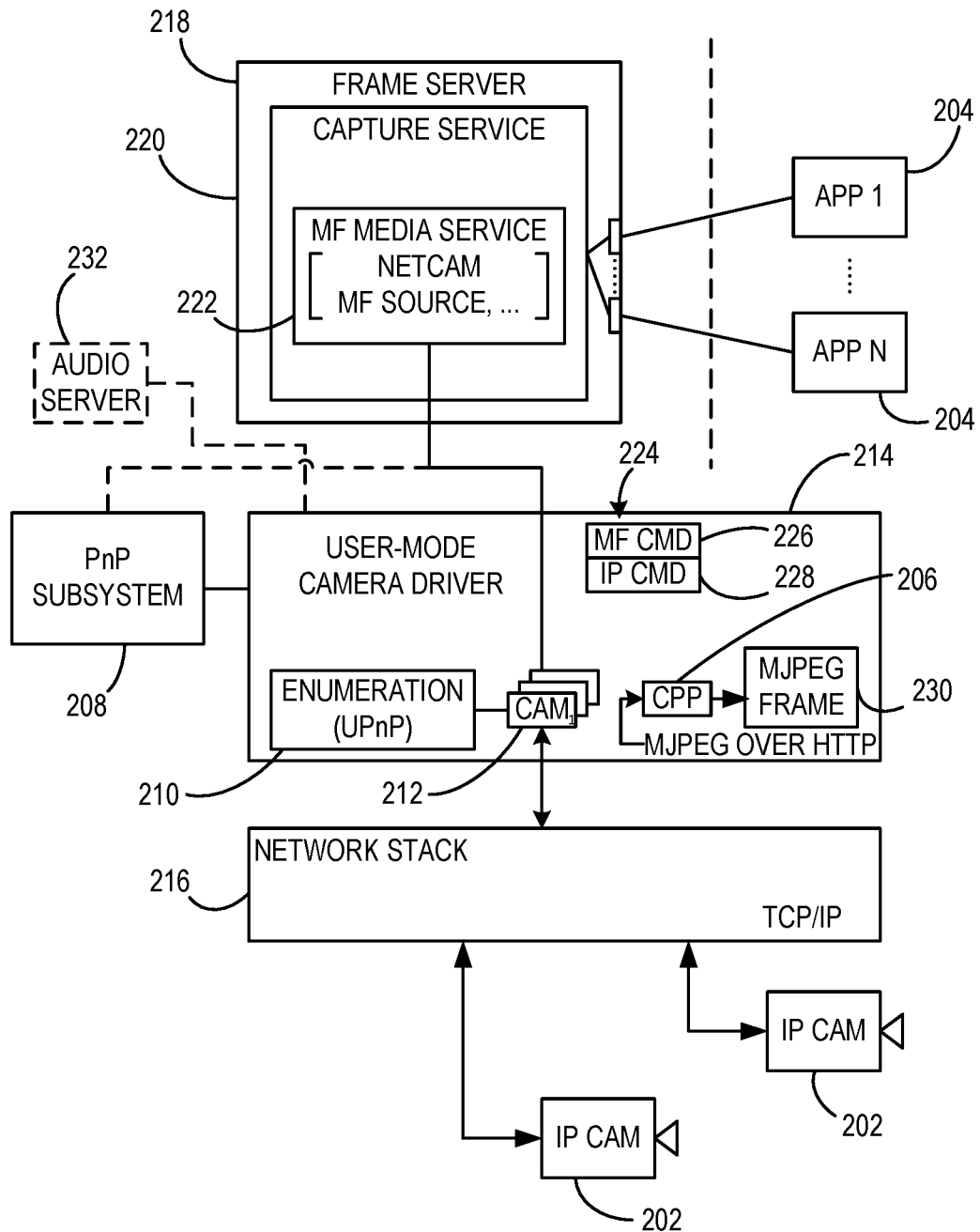
FIG. 2 illustrates an exemplary user-mode camera driver arrangement according to an embodiment.

FIG. 2 illustrates a system 200 for implementing device discovery and enumeration to expose, for example, a plurality of IP cameras 202 (two IP cameras 202 are illustrated in the example) that are made available to a plurality of applications 204, such as for streaming video from one or more of the IP cameras 202. It should be appreciated that the system 200 can be implemented in connection with different devices, including different non-camera devices. The system uses the CPP 206 for payload processing to formulate a usable data stream for a display pipeline when data packets are received from the IP cameras 202.

In one example, a PnP subsystem 208 allows for enumeration of the IP cameras 202 using an enumeration component as part of the data stack, illustrated as a UPnP enumeration module 210 as part of a user-mode camera driver 214 (e.g., UMDF driver) that creates a device object 212 corresponding to each detected IP camera 202 (configured in one example as a UMDF Net Camera Driver). In particular, the UPnP enumeration module 210 is configured with a set of networking protocols that allows for discovery of the IP cameras 202 on the network and that allows for data sharing. In some examples, the UPnP enumeration module 210 is configured with a set of networking protocols for use in a residential or home network. However, the UPnP enumeration module 210 can be configured with networking protocols for use with other types of networks. Thus, device to device networking is more easily accomplished and a direct interface to the operating system is provided.

In operation, the system 200 discovers and enumerates the IP cameras 202 using the UPnP protocol with the use-mode framework (implemented by the user-mode camera driver 214 conforming to the UMDF development platform in one example) running as a bus driver to poll the IP cameras 202 to obtain information from the IP cameras 202 (i.e., discover the IP cameras 202). In this configuration, the control operations for device discovery and enumeration are provided as part of the operating system and not part of a custom vendor program. It should be noted that the IP cameras 202 are configured to support the UPnP protocol.

In one example, the system 200 operates in a device monitor and discovery mode to collect device presence information and properties of the IP cameras 202 over a network, such as an IP network. The collected information and properties are stored in the corresponding device object 212, which in some embodiments are provided in a device store that can be later accessed to obtain the information and properties. The information and properties in some examples includes properties of the IP cameras 202 (e.g., available functions of the IP cameras 202, such as the media types supported) and information to connect to and interact with the IP cameras 202 using a device class specific protocol, which is implemented in a UMDF architecture in one example, over IP. Thereafter, when a computer interfaces with one or more of the IP cameras 202 to, for example, retrieve streaming data via the frame server 218, the user-mode camera driver 214 retrieves the Hypertext Transfer Protocol (HTTP) uniform resource locator (URL) from the corresponding device object 212 and sends UPnP messages (in accordance with the UPnP standard) as HTTP requests to the URL. It should be noted that each instance of the device object 212 corresponds to a different detected IP camera 202.

The system 200 uses the information obtained from the IP cameras 202 by the user-mode camera driver 214 to create information nodes for the IP cameras 202 that are then registered with the operating system, which nodes are then exposed (enumerated) to all of the applications 204 by the operating system. In various examples, when one or the IP cameras 202 is powered off, the device node goes defunct, such that the powered off IP camera 202 is no longer exposed to the applications 204 (e.g., de-registered).

More particularly, the user-mode camera driver 214 uses UPnP to identify the IP cameras 202 and then creates the device objects 212 (in this example, camera objects) corresponding to each of the detected IP cameras 202. The user-mode camera driver 214 in various examples is a module registered in the operating system to identify the IP cameras 202 to the operating system that then makes the IP cameras 202 available to the applications 204. As a result, different applications (e.g., different vendor applications) are not used to discover and communicate with different types of IP cameras 202, such as IP cameras 202 from different vendors.

In one example, when the IP cameras 202 are to be exposed, the device objects 212 register with the kernel stream (e.g., a KS.sys file) in UMDF. For example, each of the device objects 212 registers a NetCam Source (e.g., NetCam Media Foundation Source (MFSource)), etc. for each of the IP cameras 202, such that the user-mode camera driver 214 can refer to the kernel stream by invoking UMDF interfaces and sharing the same logic and data structures with the kernel stream.

The kernel stream in some examples is provided by a kernel library file (KS.sys) that is a shared library or shared object that can be shared by different executable files. In one example, the kernel library file is a dynamic-link library that is a code library that can be used by multiple processes, while only one copy is loaded into memory. As should be appreciated, the kernel library file implements different functions in the kernel mode that allows for processes to communicate with hardware in this protected mode. In one example, the kernel library file is a kernel-mode library that allows the one or more of the applications 204 to access the IP cameras 202 by utilizing routines provided within the kernel library file to communicate with the user-mode camera driver 214, with the device objects 212 corresponding to the detected IP cameras 202. In some examples, the IP cameras 202 are configured to communicate in the kernel mode using a format supported by the IP cameras 202 (e.g., JPEG, H.264, etc.).

Thus, using the user-mode camera driver 214, the IP cameras 202 are exposed to the frame server 218 that includes a capture service 220 running an MF Media Service 222 that enable the applications 204 to, for example, stream video from the IP cameras 202. For example, the MF Media Service 222 is part of an IMF Media Engine Interface that uses acquired information for each of the IP cameras 202 (e.g., NetCam MFSource that identifies the URL of the IP camera 202, etc.) to allow streaming of video from one or more of the IP cameras 202. The camera sources are represented in the camera pipeline and exposed as a regular camera, that is a connected camera device, such as the IP camera 202. Thus, the user-mode camera driver 214 operates as a network camera bus driver that exposes all of the camera sources on the network, in this example, all of the IP cameras 202 connected to the network (e.g., the network 116 shown in FIG. 1) to allow operations of the IP cameras 202 to be controlled.

In various examples, with the device objects 212 registered with the PnP subsystem 208, the corresponding IP cameras 202 are enumerable to the operating system. For example, in operation, when an IP camera 202 is detected (such as a new camera connected to the network), an operating system representation of the IP camera 202 is created, illustrated as the device object 212, and then the IP camera 202 is registered with the PnP subsystem 208, thus being registered with the operating system, and exposed to the frame server 218 (or other camera server) that is able to enumerate the IP camera 202, which the applications 204 can then identify as available camera devices. Thereafter, to communicate with one of the IP cameras 202, the application (s) 204 issues a command (e.g., start streaming command) to the user-mode camera driver 214 (having the registered instance of the IP camera 202 from which the application(s) 204 is requesting streaming). The user-mode camera driver 214 then generates and transmits control commands to the corresponding IP camera 202 using the network stack 216 and processes received data packets from the IP cameras 202.

It should be noted that the command can be a call made by an application programming interface (API) to start streaming from the specific IP camera 202. It should also be noted that the commands can include any command type, such as, but not limited to start streaming, stop streaming, querying all capabilities (hundreds of characteristics), querying camera frame data, querying partial frames and assembling the partial frames, configuring of the streams, focus (auto and manual), etc.

In one example, the user-mode camera driver 214 includes a translation layer or component that converts or translates the MF command 226 to an IP command 228, such as an IP device command for controlling the IP camera 202, which can be sent over the network stack 216. Thus, the user-mode camera driver 214 is configured to generate the appropriate command for controlling the IP camera 202. In one example, the user-mode camera driver 214 is configured to packetize the commands (e.g., generate the header(s) and payload) to send across the network stack 216.

In a similar manner, the CPP 206 of the user-mode camera driver 214, when receiving data packets from the IP camera 202 processes the data packets and strips the headers (e.g., HTTP headers) from the data packets (i.e., parses the payload) and uses the payload to create (assemble) a consumable (i.e., useable) frame that is stored in an output buffer 230. The frame is then sent to the operating system component, in this example, to the frame server 218 that the applications 204 can access to obtain the consumable frame. The frame server 218 is configured as the camera pipeline of the operating system to provide the image frames to the applications 204, such that, for example, H.264 over HTTP streaming is enabled. Thus, for example, a Motion Joint Photographic Experts Group (MJPEG) over HTTP data packet is processed to generate an MJPEG frame that is sent to the frame server 218, such as in a video streaming application.

In one example, the present disclosure is configured to allow streaming audio and video from the IP camera 202, such as using the Real Time Streaming Protocol (RTSP). For example, during the discovery mode, if a determination is made that the IP camera 202 supports audio and video capabilities, another device is registered with the audio capability, such as a separate device object 212. Thus, when a mixed data stream, including audio and video is received, the CPP 206 in this example is configured to demultiplex the interleaved signal to generate useable audio data and video data. As should be appreciated, the video data is transmitted to the frame server 218, operating as a video server, and the audio is transmitted to an audio server 232.

It should be noted that the CPP 206 can be modified to accommodate different or new incoming protocols, such as by programming the CPP 206 to decode and assemble the data frames from these different communication protocols.

In the illustrated example, the user-mode camera driver 214 communicates as part of a network stack 216, for example, a Transmission Control Protocol/Internet Protocol (TCP/IP) stack that defines the communication protocols for communicating with the IP cameras 202. For example, with UPnP, when a user plugs a device into a network, such as one of the IP cameras 202, the device configures itself to the network, acquires a TCP/IP address from the network, and a discovery protocol is used based on HTTP to announce the presence of the IP camera 202 on the network to other devices. Thus, the user-mode camera driver 214 is configured in various examples as a network camera bus driver that allows for operating system supported discovery of the IP cameras 202. As such, an operating system support solution for finding (discovering) and installing the IP cameras 202 (and exposing the cameras to the applications 204) without the use of vendor specific programs is thereby provided. Thus, various examples use an MF structure, such as by generating an MF API to support different camera protocols (e.g., JPEG, MJPEG, H.264, etc.) or video coding formats of different IP cameras 202, such as IP cameras 202 from different manufacturers or vendors. As such, incoming data packets, including one or more data frames in different formats, are decoded and assembled for transmitting to the frame server 218, which are available to the requesting application(s) 204 as part of the camera pipeline.

Accordingly, in some example, a single user-mode camera device (e.g., the user-mode camera driver 214) generates generic camera device objects that enable discovery and communication with camera devices of different types (e.g., having different communication protocols and provided from different vendors) directly from the operating system. For example, the system 200 allows for discovery of the IP cameras 202, such as USB cameras from different vendors or manufacturers with the user-mode camera driver 214 that can be exposed to the applications 204. With the user-mode camera driver 214, the system 200 is enabled to query the IP cameras 202 to obtain a set of properties used to generate the device object 212 corresponding to each of the IP cameras 202. That is, and as described herein, a separate device object 212 is generated with the set of properties for each connected IP camera 202. In some examples, wherein the IP camera 202 is capable of audio and video operation, separate device objects 212 are generated for the audio capability of the IP camera 202 and the video capability 202 of the IP camera 202. The set of properties can be defined, for example, by descriptors (e.g., resolution, frame rate, media types, streams available, controls for brightness, zoom, etc.) for each of the IP cameras 202. The descriptor, thus, contains information about the device.

The descriptors are used by the operating system to derive different sets of information using processes in the device descriptor generation technology. The descriptors are then exposed to the operating system, for example, to define different available camera services of the frame server service 218 in the user mode, such that the IP cameras 202 are enumerated and exposed to the operating system. Thereafter, an API call can be made, for example, to start streaming from one of the IP cameras 202, such as a specific USB camera, as described herein.

It should be appreciated that the present disclosure allows device discovery and communication with the IP cameras 202 by the operating system is a user-mode instead of a kernel-mode. As such, the discovery operation, for example, does not operate in a privileged execution mode (or protected mode of operation). That is, the kernel mode is a mode in which processes perform functions, such as interacting with hardware that processes executing in user mode are prohibited from performing.

In one example, a device object 212 is created for each IP camera 202 that supports the UPnP protocol, which can then be selected by a user in the applications 204 (e.g., in a camera select drop down menu that exposes a slider box to the user to allow sending control values to the selected IP camera 202). With the user-mode camera driver 214, plug and play functionality for the IP cameras 202 allows for recognizing and communicating with IP cameras 202 having different configurations from different vendors or manufacturers. That is, the frame server 218 of the operating system is enabled to access images, such as video frames, from the different IP cameras 202 without the use of camera or vendor specific programs or applications. Thus, a direct interface from the IP cameras 202 to the operating system allows the operating system to directly discover and control the IP cameras 202 without using a specialized program or application for different IP cameras 202, such that a simplified process results with an improved user experience.

It should be noted that the present disclosure provides a user-mode process for discovering and communicating with network cameras interfaced directly with the operating system. This process allows for an operating system interface to any type of camera device, such that the capabilities of the camera devices can be exposed and controlled by the user. For example, with the user-mode camera driver 214 registered in the operating system, the functionality of the different camera types is discovered and exposed to the applications 204. The applications 204 are then enabled to control the IP cameras 202, such as by issuing commands to, for example, start streaming, stop streaming, configuring of the data streams, focus (auto and manual), etc.

Figure 3:
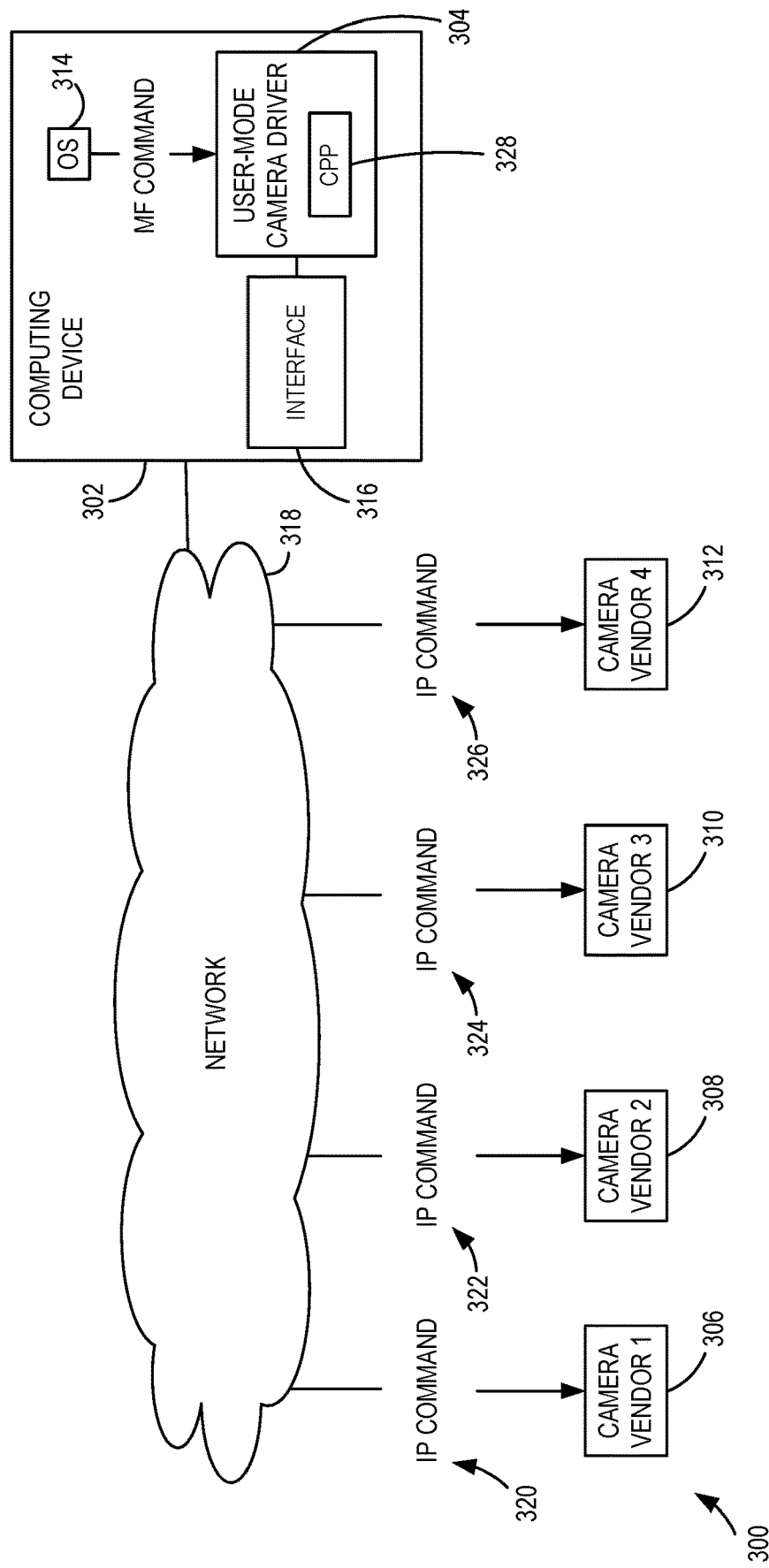
FIG. 3 illustrates an exemplary control arrangement according to an embodiment.

In one example, the user-mode camera driver 214 (running in the user mode) allows plug and plug ease of camera capability discovery and subsequent camera control without vendor programs or software to support the particular camera. Thus, the present disclosure allows for discovery and control of network cameras with a user-mode camera driver that enables direct interfacing of the operating system with a connected network camera. For example, as illustrated in FIG. 3, a system 300 includes a computing device 302 having a user-mode camera driver 304 configured according to the present disclosure. The user-mode camera driver 304 allows camera plug and play discovery and control directly from an operating system (OS) 314 for any camera device connected to the computing device 302 and compliant with the UPnP protocol. In the illustrated example, the computing device 302 is connected to cameras 306, 308, 310 and 312 via a network 318, which are illustrated as cameras from different vendors (illustrated as Vendors 1-4) that have different command and control requirements, and that would otherwise communicate using a vendor specific application or program. It should be appreciated that one or more of the cameras 306, 308, 310 and 312 can be connected directly to the computing device 302 and this configuration is contemplated by the present disclosure.

The computing device 302 is programmed with code that allows for enumeration of the cameras the 306, 308, 310 and 312 directly by the operating system 314 with the user-mode camera driver 304. That is, the operating system 314 is enabled to directly interface with the cameras 306, 308, 310 and 312 in the user mode, illustrated by the interface 316, without installation of vendor specific programs for communicating with the cameras 306, 308, 310 and 312. As described herein, the user-mode camera driver 304 is configured to implement the interface 316 to the hardware of the cameras 306, 308, 310 and 312 from the operating system 314 by generating generic camera device objects with the user-mode camera 304 that is registered in the operating system 314.

It should be appreciated that the cameras 306, 308, 310 and 312 may be of any type and the number of cameras 306, 308, 310 and 312 is shown merely for example. Cameras from many different vendors may be connected to the computing device 302.

Each of the cameras 306, 308, 310 and 312 has a vendor-specific uniqueness in the illustrated example. The system 300 allows for integration of the cameras 306, 308, 310 and 312 by exposing the cameras 306, 308, 310 and 312 to the operating system 314 with the user-mode camera driver 304 that allows the direct interface to the cameras 306, 308, 310 and 312 without vendor-specific applications. Thus, the functionality of the cameras 306, 308, 310 and 312 is accessible directly from the operating system 314 instead of through the vendor-specific applications.

The user-mode camera driver 304 in one example generates a packetized command (e.g., IP command) based on an MP command that can then be sent over the network 318. For example, as described herein, a translation component of the user-mode camera driver 304 performs the translation to generate the appropriate command for controlling the cameras 306, 308, 310 and 312. For example, USB packetized commands 320, 322, 324 and 326, such as formatted for communication over a TCP/IP stack, are generated and sent to the cameras 306, 308, 310 and 312, which can be used to query the capabilities of the cameras 306, 308, 310 and 312, control operations of the cameras 306, 308, 310 and 312 (e.g., start streaming operation), etc.

The responses from the cameras 306, 308, 310 and 312, particularly the data packets from the cameras 306, 308, 310 and 312 are processed by a CPP 328. For example, when receiving data packets from the cameras 306, 308, 310 and 312, the CPP 328 processes the data packets and strips the headers (e.g., HTTP headers) from the data packets (i.e. parses the payload) and uses the payload to create (assemble) a consumable (i.e. useable) frame. The frame is then sent to the operating system 314 (e.g., a frame server) that applications can access to obtain the consumable frame. As such, a camera pipeline of the operating system 314 is defined to provide the image frames to the applications, such that, for example, H.264 over HTTP streaming is enabled. For example, a MJPEG over HTTP data packet is processed to generate an MJPEG frame for a video streaming application.

As should be appreciated, the commands can flow in either direction between the host (e.g., computing device 302) and the cameras 306, 308, 310 and 312. In various examples, a command includes instructions, data, and interrupts. For example, when a command flows from the host to one or more of the cameras 306, 308, 310 and 312, the command includes instructions such as mode changes, along with any associated data. Similarly, and as another example, when a command flows from the camera 306, 308, 310 and 312 to the host, the command includes one or more of interrupts, device descriptors, pixel data in some form, etc.

Additionally, the commands in some examples are initiated not just by the host, but by the camera 306, 308, 310 or 312 as well, either in response to a command from the host (e.g. to declare the capabilities of the camera or to return frames), or as an interrupt to the host to notify the host of changes in its environment (e.g. availability of a frame data, occurrence of a thermal event, a detected presence of an object of interest or an activity of interest, etc.).

Figure 4:
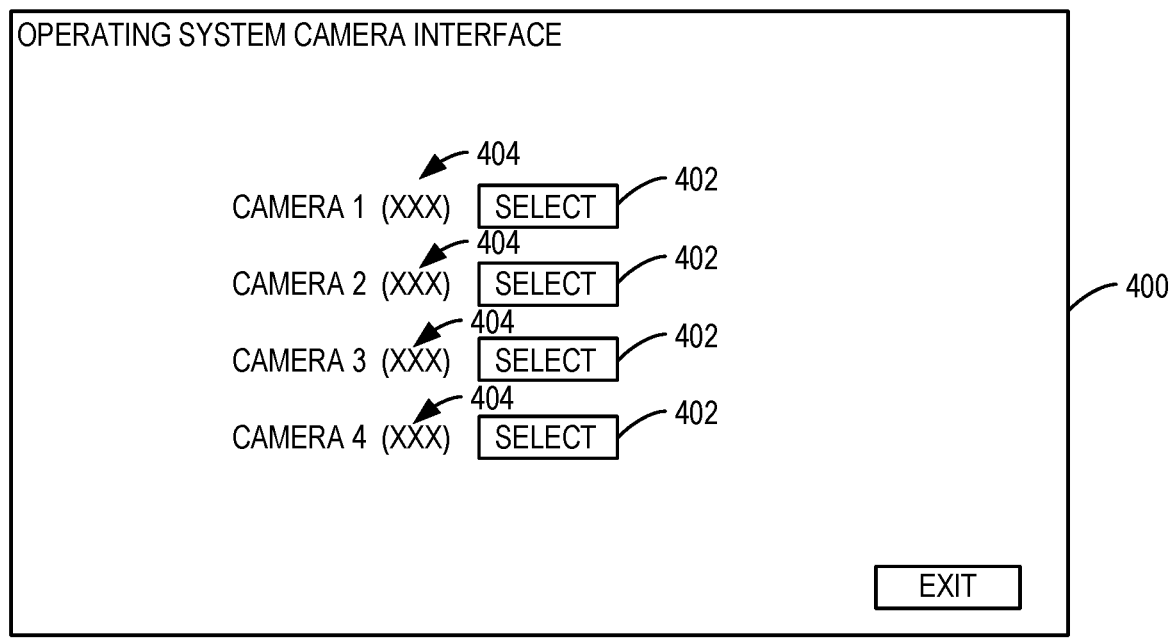
FIG. 4 illustrates an exemplary operating system camera interface screen according to an embodiment.

Thus, the user-mode camera driver 304 generates a generic camera device object that allows for the direct interfacing of the operating system 314 to the cameras 306, 308, 310 and 312. Thus, different vendor-specific applications are not downloaded when a new camera is connected to the network 318, but instead the user-mode camera driver 304 enables a direct interface to the operating system 314, such as with an operating system window 400, illustrated in FIG. 4 as an operating system camera interface window.

With the present disclosure, network cameras connected to the system 300 are exposed to the operating system, which may be selected, such as with user-interface elements 402. In the illustrated example, the operating system window 400 also displays information 404 corresponding to each of the cameras (identified as Camera 1, Camera 2, Camera 3 and Camera 4). For example, the information 404 may identify the camera type or vendor, a resolution of the camera, or other information. It should be appreciated that different user interfaces or applications also can communicate with the exposed network cameras according to the present disclosure.

With reference again to FIG. 3, the user-mode camera driver 304 allows an operating system to directly interface with the cameras 306, 308, 310 and 312, which may be controlled by the user, such as with the operating system window 400. As such, a separate user interface as part of a vendor-specific application is not accessed for each of the different cameras 306, 308, 310 and 312. Thus, a universal user interface for controlling all of the cameras 306, 308, 310 and 312 is also provided. Simplified plug and play camera operation thereby results, with an improved user experience. As should be appreciated, the user-mode camera driver 304 can be updated as desired or needed, such as to accommodate new cameras from different vendors. Moreover, using UPnP discoverability of supported cameras, the user-mode camera driver 304 is device type independent.

Figure 5:
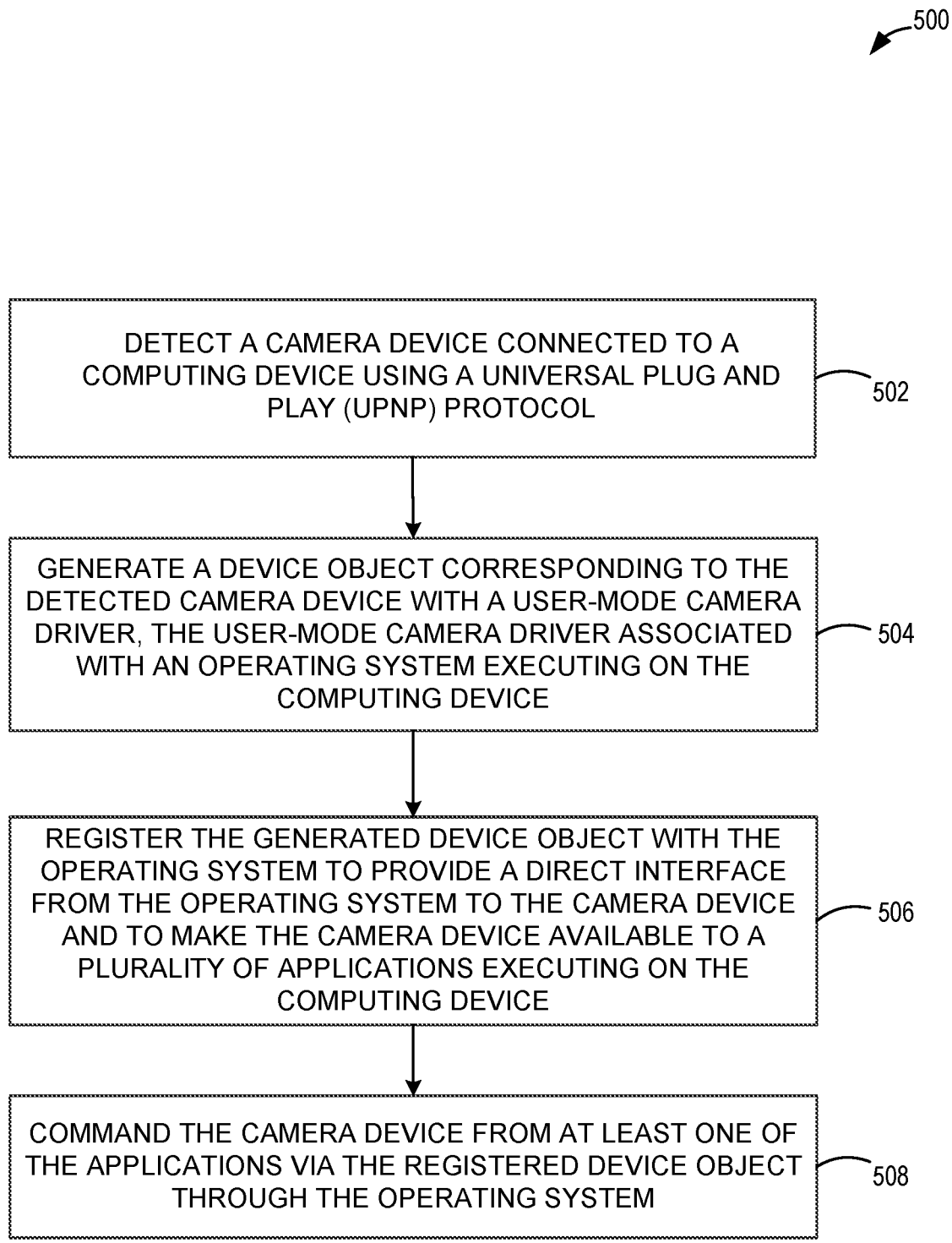
FIG. 5 is an exemplary flow chart illustrating a method for discovering and exposing a camera according to an embodiment.

FIG. 5 is a flow chart 500 illustrating operation of a computing device (e.g., the computing device 302) configured to discover and enumerate (expose) a camera directly from the operating system according to one example. The operations illustrated in the flow charts described herein may be performed in a different order than are shown, may include additional or fewer steps and may be modified as desired or needed. Additionally, one or more operations may be performed simultaneously, concurrently or sequentially.

At 502, a camera device connected to a computing device is detected using the UPnP protocol. The computing device is able to detect any camera device connected thereto that supports the UPnP protocol. For example, using the UPnP set of networking protocols, the computing device is able to detect any supported camera devices, such as any cameras devices connected to a home network. The UPnP protocol allows for the computing device and other devices that come in proximity to the home network (e.g., a portable mobile device of the home owner) to discover the presence of all supported camera devices on the home network.

Additionally, using methods in the UPnP technology, functional network services, such as for data sharing, communications, etc. are established. For example, with the home network supporting IP communication, the computing device is able to obtain device/service descriptions, perform control actions, transfer data, generate different events, etc. with the camera devices using a TCP/IP data stack. It should be noted that various different capabilities of the camera devices are exposed to the operating system of the computing device based on descriptors received from the camera during the discovery operation performed using the UPnP protocol. Thus, with UPnP, dynamic detection and discovery of the camera devices on the home network is provided.

It should be noted that the present disclosure can be implemented in connection with other networks, such as non-home networks, including other private networks. Additionally, the present disclosure contemplates camera device detection and discovery using any suitable protocol that allows for such operations to be performed.

At 504, the computing device generates a device object corresponding to the camera device detected with the user-mode camera driver. The user-mode camera deriver is associated with an operating system executing on the computing device. The device object is a generic camera device object that is compatible with different vendors or manufacturers of the camera device and generated with the user-mode camera driver as described herein. In one example, the user-mode camera driver conforms to the UMDF development platform and is registered with the operating system. In some examples, the computing device operates in a user-mode driver framework running as a bus driver that is part of the operating system and not part of a custom application or a vendor program. Thus, different vendor specific applications are not used to enumerate the camera devices.

The camera device is then enumerated to one or more applications. In particular, at 506, the generated device object is registered with the operating system to provide a direct interface from the operating system to the camera device and to make the camera device available to a plurality of applications executing on the computing device. For example, the user-mode camera driver polls the camera devices after detecting the camera devices to obtain device information for each of the camera devices used to communicate with and control the camera devices. Thus, in some examples, an information node is created for each of the camera devices, which are then exposed to the operating system of the computing device, such that all of the detected camera devices are enumerated to the operating system. As a result, an operating system interface can directly access the device information and expose all of the camera devices to all of the applications executing on the computing device.

At 508, the camera device is commanded from one or more of the plurality of application via the registered device object through the operating system. For example, as described herein, packetized commands are sent to the camera device to control operation of the camera device (e.g., streaming video from the camera device).

It should be noted that other computing devices that access the network with the connected camera devices similarly can have the camera devices exposed thereto. In particular, the operating system of the other computing devices can directly interface with the camera devices in accordance with the present disclosure.

Figure 6:
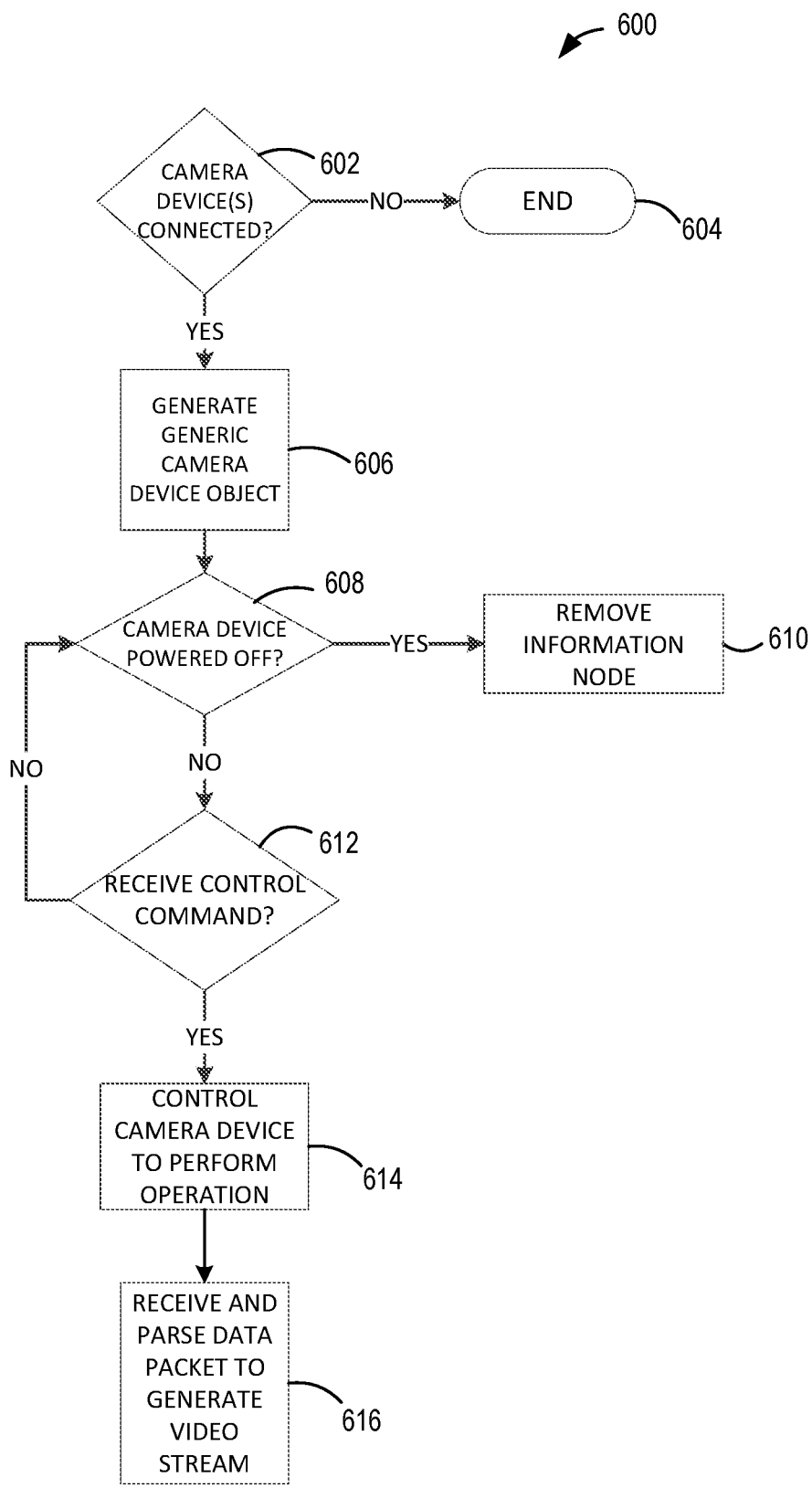
FIG. 6 is an exemplary flow chart of and installation and control method according to an embodiment.

An operational example is shown in the flow chart 600 illustrated in FIG. 6. It should be appreciated that the present disclosure contemplates use with any type of operating system and any type of device, including different types of cameras, that are configured according to UMDF or any other suitable or compatible user-mode driver architecture. A computing device configured according to FIG. 6 is able to have an operating system directly interface with camera devices without using vendor specific applications or programs.

At 602, a determination is made whether one or more new camera devices are connected to the system. For example, a determination is made whether a new camera device is connected to a port of the system, such as when connecting a new USB camera device (or other IP camera device) to the computing device for a first time. This determination is made, for example, upon the detection of the connection of an IP camera (supporting the UPnP protocol) to a home network. For example, a UPnP discovery process is initiated in some examples to detect the camera device.

If the new newly connected device is not a supported camera device (e.g., a camera device not supporting UPnP), the method ends at 604. It should be noted that in some examples, if the device is a non-camera device (regardless of whether the device supports UPnP), the method similarly ends at 604. It also should be noted that the determination of whether a newly connected device is a supported device can be performed each time a device is connected to the network and may also be performed periodically, if desired.

If a determination is made at 602 that one or more camera devices are connected and discoverable using UPnP, a generic camera device object is generated at 606. For example, the user-mode camera driver described herein generates a device object for each of the camera devices. The user-mode camera driver is a UMDF camera driver in some examples that is registered in the operating system. Thus, the device object generation is performed within the user-mode that is independent of the vendor type or manufacturer type of the camera device. Thus, a user-mode framework driver running as a bus driver is part of the operating system and not part of a custom application or vendor program.

In one example, the camera objects created and that correspond to each of the detected camera devices, register with the kernel stream of the UMDF platform. As part of this registration, MF commands are also registered as described herein. In various examples, the camera object is generated with device properties determined during a querying or polling process when the camera device is discovered using UPnP. Thus, an information node is created for each camera device that can be registered with the operating system and exposed to one or more application. As such, the detected camera devices are enumerated to all of the applications on the computing device. Thus, the detected camera devices are exposed to the applications based on the device objects generated for the camera devices.

A determination is then made at 608 whether any of the detected camera devices having a corresponding device object have been powered off. If any of the camera devices have been powered off (or have otherwise failed), the information node for that camera device is removed from the operating system at 610. For example, the device object for that camera device is de-registered from the operating system. Thus, the information node or device node corresponding to that device goes defunct when the device powers off.

For devices having a device object, a determination is made at 612 whether a control command is received for any of the device objects. For example, a determination a made whether an API call has been made to control operation of one of the camera devices, such as to start streaming video from the camera device. If no commands have been issued, a determination can again be made whether any of the camera devices have powered off at 608. If a determination is made at 612 that a control command has been issued, the corresponding camera device is controlled to perform an operation at 614. For example, the user-mode camera driver converts the MF command from an API call to an IP command that is packetized and sent to the camera device to be controlled. Continuing with the streaming video example, a packetized command to start video streaming is sent over the TCP/IP stack to the camera device. In some examples, the user-mode camera driver includes a translation component that translates the MF command to an IP command.

At 616, data packets are received by the user-mode camera driver from the camera device in response to the command generated and sent by the user-mode camera driver. For example, acquired video image data (and optionally corresponding audio data) is received by the user-mode camera driver, which parses the data packets with a common parser plugin to assemble video frames. The common parser plugin is configured to parse data packets communicated using different transmission protocols and the user-mode camera driver then transmits the assembled video frames to, for example, a frame server to generate a video stream accessible by the one or more applications. In one example, the video stream is dynamically recognized, with a plug-in launched and the incoming stream parsed to convert data packets to video frames that are able to be displayed. Thus, the common parser plugin performs payload processing to formulate a useable video stream for the display pipeline.

It should be noted that a similar control arrangement can be used for audio data as described herein.

Thus, with the user-mode camera driver, a direct interface to camera devices is provided that allows for discovery and control of the camera devices without vendor specific or manufacturer specific programs, applications or other user control interfaces.

Exemplary Operating Environment

Figure 7:
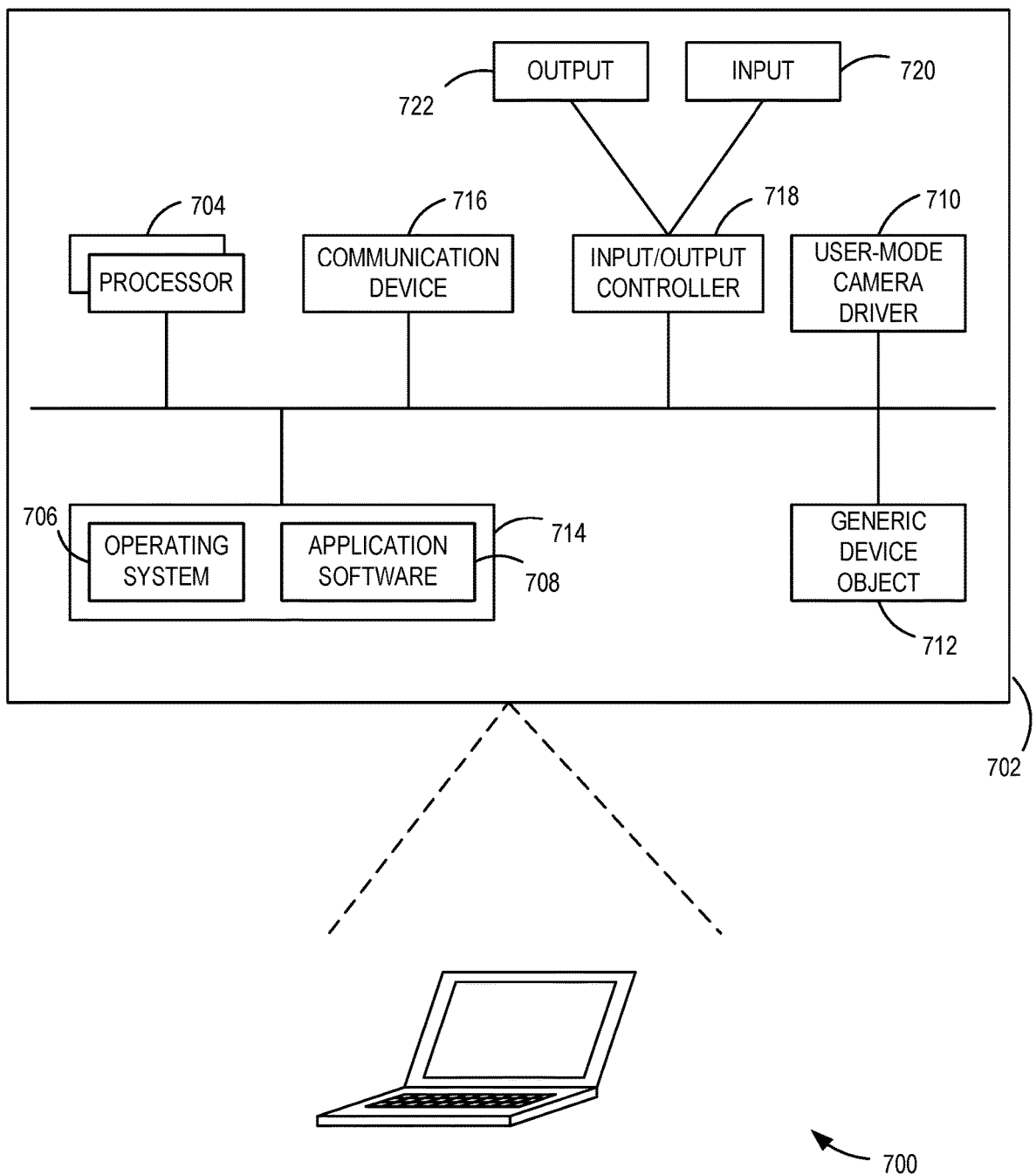
FIG. 7 illustrates a computing apparatus according to an embodiment as a functional block diagram.

The present disclosure is operable with a computing apparatus 702 according to an embodiment as a functional block diagram 700 in FIG. 7 that is capable of connection, for example, to different types of camera devices (e.g., different IP cameras on a home network). In an embodiment, components of the computing apparatus 702 may be implemented as a part of an electronic device according to one or more embodiments described in this specification. The computing apparatus 702 comprises one or more processors 704 which may be microprocessors, controllers or any other suitable type of processors for processing computer executable instructions to control the operation of the electronic device. Platform software comprising an operating system 706 or any other suitable platform software may be provided on the apparatus 702 to enable application software 708 to be executed on the device. According to an embodiment, discovery and control of a connected device (e.g., IP camera) using a user-mode camera driver 710 that generates a generic device object 712 may be accomplished by software.

Computer executable instructions may be provided using any computer-readable media that are accessible by the computing apparatus 702. Computer-readable media may include, for example, computer storage media such as a memory 714 and communications media. Computer storage media, such as the memory 714, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 714) is shown within the computing apparatus 702, it will be appreciated by a person skilled in the art, that the storage may be distributed or located remotely and accessed via a network or other communication link (e.g. using a communication device 716).

The computing apparatus 702 may comprise an input/output controller 718 configured to output information to one or more input devices 720 and output devices 722, for example a display, a speaker or a camera, which may be separate from or integral to the electronic device. The input/output controller 718 may also be configured to receive and process an input from one or more input devices 720, for example, a keyboard, a microphone or a touchpad. In one embodiment, the output device 722 may also act as the input device 720. An example of such a device may be a touch sensitive display. The input/output controller 718 may also output data to devices other than the output device 722, e.g. a locally connected printing device or camera device. In some embodiments, a user may provide input to the input device(s) 720 and/or receive output from the output device(s) 722.

In some examples, the computing apparatus 702 detects voice input, user gestures or other user actions and provides a natural user interface (NUI). This user input may be used to author electronic ink, view content, select ink controls, play videos with electronic ink overlays and for other purposes. The input/output controller 718 outputs data to devices other than a display device in some examples, e.g. a locally connected printing device or camera device.

The functionality described herein can be performed, at least in part, by one or more hardware logic components. According to an embodiment, the computing apparatus 702 is configured by the program code when executed by the processor(s) 704 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for camera device discovery and enumeration, the system comprising:

at least one processor; and at least one memory comprising computer program code, the at least one memory and the computer program code configured to, with the at least one processor, cause the at least one processor to:

detect a camera device connected to a computing device using a Universal Plug and Play (UPnP) protocol;

generate a device object corresponding to the detected camera device with a user-mode camera driver, the user-mode camera driver associated with an operating system executing on the computing device;

register the generated device object with the operating system to provide a direct interface from the operating system to the camera device and to make the camera device available to a plurality of applications executing on the computing device; and command the camera device from at least one of the plurality of applications via the registered device object through the operating system.

The system described above, wherein the computer program code is further configured to, with the at least one processor, cause the at least one processor to:

query the camera device to obtain a set of properties for the camera device;

generate the device object with the obtained set of properties; and register the set of properties with a media service of the operating system.

The system described above, wherein the computer program code is further configured to, with the at least one processor, cause the at least one processor to parse a command received from the camera device using a common parser plugin.

The system described above, wherein the computer program code is further configured to, with the at least one processor, cause the at least one processor to:

parse data packets received from the camera device using a common parser plugin to assemble video frames based on the data packets received from the camera device, the common parser plugin configured to parse data packets communicated using different transmission protocols; and transmit the video frames to a frame server to generate a video stream accessible by the one or more applications.

The system described above, wherein the computer program code is further configured to, with the at least one processor, cause the at least one processor to:

receive as the command from the at least one of the plurality of applications, a start streaming video camera;

packetize the command using the user-mode camera driver and send the command to the camera device; and receive from the camera device, in response to the command from the user-mode camera driver, the data packets to be parsed.

The system described above, wherein the computer program code is further configured to, with the at least one processor, cause the at least one processor to translate user control commands from a media format to an Internet Protocol (IP) format using the user-mode camera driver.

The system described above, wherein the computer program code is further configured to, with the at least one processor, cause the at least one processor to remove the device object based on a powering off of the camera device.

A computerized method for camera device discovery and enumeration, the computerized method comprising:

detecting a camera device connected to a computing device using a Universal Plug and Play (UPnP) protocol;

generating a device object corresponding to the detected camera device with a user-mode camera driver, the user-mode camera driver associated with an operating system executing on the computing device;

registering the generated device object with the operating system to provide a direct interface from the operating system to the camera device and to make the camera device available to a plurality of applications executing on the computing device; and providing communication between the camera device and the plurality of applications via the registered device object through the operating system.

The computerized method described above, further comprising:

querying the camera device to obtain a set of properties for the camera device;

generating the device object with the obtained set of properties; and registering the set of properties with a media service of the operating system.

The computerized described above, further comprising parsing a command received from the camera device using a common parser plugin.

The computerized described above, further comprising:

parsing data packets received from the camera device using a common parser plugin to assemble video frames based on the data packets received from the camera device, the common parser plugin configured to parse data packets communicated using different transmission protocols; and transmitting the video frames to a frame server to generate a video stream accessible by the one or more applications.

The computerized described above, further comprising:

receiving as the command from the at least one of the plurality of applications, a start streaming video camera;

packetizing the command using the user-mode camera driver and send the command to the camera device; and receiving from the camera device, in response to the command from the user-mode camera driver, the data packets to be parsed.

The computerized described above, further comprising translating user control commands from a media format to an Internet Protocol (IP) format using the user-mode camera driver.

The computerized described above, further comprising removing the device object based on a powering off of the camera device.

One or more computer storage media having computer-executable instructions for connecting to a camera device that, upon execution by a processor, cause the processor to at least:

detect a camera device connected to a computing device using a Universal Plug and Play (UPnP) protocol;

generate a device object corresponding to the detected camera device with a user-mode camera driver, the user-mode camera driver associated with an operating system executing on the computing device;

register the generated device object with the operating system to provide a direct interface from the operating system to the camera device and to make the camera device available to a plurality of applications executing on the computing device; and provide communication between the camera device and the plurality of applications via the registered device object through the operating system.

The one or more computer storage media described above having further computer-executable instructions that, upon execution by a processor, cause the processor to at least:

query the camera device to obtain a set of properties for the camera device;

generate the device object with the obtained set of properties; and register the set of properties with a media service of the operating system.

The one or more computer storage media described above having further computer-executable instructions that, upon execution by a processor, cause the processor to at least parse a command received from the camera device using a common parser plugin.

The one or more computer storage media described above having further computer-executable instructions that, upon execution by a processor, cause the processor to at least:

parse data packets received from the camera device using a common parser plugin to assemble video frames based on the data packets received from the camera device, the common parser plugin configured to parse data packets communicated using different transmission protocols; and transmit the video frames to a frame server to generate a video stream accessible by the one or more applications.

The one or more computer storage media described above having further computer-executable instructions that, upon execution by a processor, cause the processor to at least:

receive as the command from the at least one of the plurality of applications, a start streaming video camera;

packetize the command using the user-mode camera driver and send the command to the camera device; and receive from the camera device, in response to the command from the user-mode camera driver, the data packets to be parsed.

The one or more computer storage media described above having further computer-executable instructions that, upon execution by a processor, cause the processor to at least remove the device object based on a powering off of the camera device.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for camera driver installation and camera control. The illustrated one or more processors 704 together with the computer program code stored in memory 714 constitute exemplary processing means for connecting to a camera device, including camera driver installation and camera control.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for camera device discovery and enumeration, the system comprising:
   at least one processor; and
   at least one memory comprising computer program code, the at least one memory and the computer program code configured to, with the at least one processor, cause the at least one processor to:
      detect a camera device connected to a computing device using a Universal Plug and Play (UPnP) protocol;
      generate a generic camera device object corresponding to the detected camera device with a user-mode camera driver to implement a direct interface to the camera device, the user-mode camera driver associated with an operating system executing on the computing device and defining a generic registration module allowing the operating system to identify the detected camera device;
      register the generated generic camera device object with the operating system to provide the direct interface from the operating system to the camera device and to make the camera device available to a plurality of applications executing on the computing device, the generated generic camera device object registered with a kernel stream in a User-Mode Driver Framework (UMDF) of the operating system, wherein the user-mode camera driver is configured to refer to the kernel stream by invoking a UMDF interface; and
      command the camera device from at least one of the plurality of applications via the registered generic camera device object through the operating system, wherein the user-mode camera driver translates an application command from the at least one of the plurality of applications to a control command to control the detected camera device based on a camera type of the detected camera device, and wherein the user-mode camera driver is a single driver configured to generate generic camera device objects that enables discovery and communication with camera devices of different types.

2. The system of claim 1, wherein the computer program code is further configured to, with the at least one processor, cause the at least one processor to:
   query the camera device to obtain a set of properties for the camera device;
   generate the generic camera device object with the obtained set of properties; and
   register the set of properties with a media service of the operating system, wherein a separate generic camera device object is generated with the set of properties for each of a plurality of detected camera devices, the plurality of detected camera devices capable of audio and video operation, and separate device objects are generated for the audio capability and the video capability of the camera devices.

3. The system of claim 1, wherein the computer program code is further configured to, with the at least one processor, cause the at least one processor to parse a command received from the camera device using a common parser plugin, wherein the user-mode camera driver shares a same logic and data structure with the kernel stream.

4. The system of claim 1, wherein the computer program code is further configured to, with the at least one processor, cause the at least one processor to:
   parse data packets received from the camera device using a common parser plugin to assemble video frames based on the data packets received from the camera device, the common parser plugin configured to parse data packets communicated using different transmission protocols; and
   transmit the video frames to a frame server to generate a video stream accessible by the one or more applications.

5. The system of claim 4, wherein the computer program code is further configured to, with the at least one processor, cause the at least one processor to:
   receive as the command from the at least one of the plurality of applications, a start streaming video camera;
   packetize the command using the user-mode camera driver and send the command to the camera device; and
   receive from the camera device, in response to the command from the user-mode camera driver, the data packets to be parsed.

6. The system of claim 1, wherein the computer program code is further configured to, with the at least one processor, cause the at least one processor to translate user control commands from a media format to an Internet Protocol (IP) format using the user-mode camera driver, wherein the single driver is configured to operate as a network camera bus driver, the single driver is configured to provide the direct interface without one or more vendor-specific applications, and the camera type comprises a camera vendor type, wherein each instance of the generic camera device object corresponds to a different detected camera device, and wherein the user-mode camera driver retrieves a Hypertext Transfer Protocol (HTTP) uniform resource locator (URL) from a corresponding generic camera device object and sends UPnP messages in accordance with a UPnP standard as HTTP requests to the URL.

7. The system of claim 1, wherein the kernel stream is defined by a kernel library file that is one of a shared library or shared object configured to be shared by different executable files, the kernel library file is a dynamic-link library that is a code library used by multiple processes, wherein only one copy of the code library is loaded into the at least one memory, and wherein the kernel library file is a kernel-mode library that allows the plurality of applications to access the cameras device by utilizing routines provided within the kernel library file to communicate with the user-mode camera driver.

8. A computerized method for camera device discovery and enumeration, the computerized method comprising:
   detecting a camera device connected to a computing device using a Universal Plug and Play (UPnP) protocol;
   generating a generic camera device object corresponding to the detected camera device with a user-mode camera driver to implement a direct interface to the camera device, the user-mode camera driver associated with an operating system executing on the computing device and defining a generic registration module allowing the operating system to identify the detected camera device;
   registering the generated generic camera device object with the operating system to provide the direct interface from the operating system to the camera device and to make the camera device available to a plurality of applications executing on the computing device, the generated generic camera device object registered with a kernel stream in a User-Mode Driver Framework (UMDF) of the operating system, wherein the user-mode camera driver is configured to refer to the kernel stream by invoking a UMDF interface; and providing communication between the camera device and the plurality of applications via the registered generic camera device object through the operating system, wherein the user-mode camera driver translates an application command from at least one of the plurality of applications to a control command to control the camera device based on a camera type of the camera device, and wherein the user-mode camera driver is a single driver configured to generate generic camera device objects that enables discovery and communication with camera devices of different types.

9. The computerized method of claim 8, further comprising:
  querying the camera device to obtain a set of properties for the camera device;
  generating the generic camera device object with the obtained set of properties; and
  registering the set of properties with a media service of the operating system.

10. The computerized method of claim 8, further comprising parsing a command received from the camera device using a common parser plugin.

11. The computerized method of claim 8, further comprising:
  parsing data packets received from the camera device using a common parser plugin to assemble video frames based on the data packets received from the camera device, the common parser plugin configured to parse data packets communicated using different transmission protocols; and
  transmitting the video frames to a frame server to generate a video stream accessible by the one or more applications.

12. The computerized method of claim 11, further comprising:
  receiving as the command from the at least one of the plurality of applications, a start streaming video camera;
  packetizing the command using the user-mode camera driver and send the command to the camera device; and
  receiving from the camera device, in response to the command from the user-mode camera driver, the data packets to be parsed.

13. The computerized method of claim 8, further comprising translating user control commands from a media format to an Internet Protocol (IP) format using the user-mode camera driver.

14. The computerized method of claim 8, further comprising removing the generic camera device object based on a powering off of the camera device.

15. One or more computer storage media having computer-executable instructions for connecting to a camera device that, upon execution by a processor, cause the processor to at least:
  detect a camera device connected to a computing device using a Universal Plug and Play (UPnP) protocol;
  generate a generic camera device object corresponding to the detected camera device with a user-mode camera driver to implement a direct interface to the camera device, the user-mode camera driver associated with an operating system executing on the computing device and defining a generic registration module allowing the operating system to identify the detected camera device;
  register the generated generic camera device object with the operating system to provide the direct interface from the operating system to the camera device and to make the camera device available to a plurality of applications executing on the computing device, the generated generic camera device object registered with a kernel stream in a User-Mode Driver Framework (UMDF) of the operating system, wherein the user-mode camera driver is configured to refer to the kernel stream by invoking a UMDF interface; and
  provide communication between the camera device and the plurality of applications via the registered generic camera device object through the operating system, wherein the user-mode camera driver translates an application command from at least one of the plurality of applications to a control command to control the camera device based on a camera type of the camera device, and wherein the user-mode camera driver is a single driver configured to generate generic camera device objects that enables discovery and communication with camera devices of different types.

16. The one or more computer storage media of claim 15 having further computer-executable instructions that, upon execution by a processor, cause the processor to at least:
  query the camera device to obtain a set of properties for the camera device;
  generate the generic camera device object with the obtained set of properties; and
  register the set of properties with a media service of the operating system.

17. The one or more computer storage media of claim 15 having further computer-executable instructions that, upon execution by a processor, cause the processor to at least parse a command received from the camera device using a common parser plugin.

18. The one or more computer storage media of claim 15 having further computer-executable instructions that, upon execution by a processor, cause the processor to at least:
  parse data packets received from the camera device using a common parser plugin to assemble video frames based on the data packets received from the camera device, the common parser plugin configured to parse data packets communicated using different transmission protocols; and
  transmit the video frames to a frame server to generate a video stream accessible by the one or more applications.

19. The one or more computer storage media of claim 18 having further computer-executable instructions that, upon execution by a processor, cause the processor to at least:
  receive as the command from the at least one of the plurality of applications, a start streaming video camera;
  packetize the command using the user-mode camera driver and send the command to the camera device; and
  receive from the camera device, in response to the command from the user-mode camera driver, the data packets to be parsed.

20. The one or more computer storage media of claim 15 having further computer-executable instructions that, upon execution by a processor, cause the processor to at least remove the generic camera device object based on a powering off of the camera device.

* * * * *